United States Patent
Judkins

(10) Patent No.: US 7,484,626 B2
(45) Date of Patent: Feb. 3, 2009

(54) WATER NANO-FILTRATION DEVICE

(75) Inventor: Roddie R. Judkins, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 492 days.

(21) Appl. No.: 11/277,246

(22) Filed: Mar. 23, 2006

(65) Prior Publication Data

US 2007/0221564 A1   Sep. 27, 2007

(51) Int. Cl.
  *B01D 29/44* (2006.01)
  *B01D 63/00* (2006.01)
  *C01F 1/00* (2006.01)

(52) U.S. Cl. ............... 210/490; 210/323.2; 210/321.6; 210/777; 210/650

(58) Field of Classification Search ............ 210/490, 210/500.25, 650, 321.6, 323.2, 777; 96/11; 502/180, 416–417; 95/114; 55/523; 427/244
See application file for complete search history.

(56) References Cited

U.S. PATENT DOCUMENTS

| | | | | |
|---|---|---|---|---|
| 4,439,349 A | * | 3/1984 | Everett et al. | 502/180 |
| 5,196,380 A | * | 3/1993 | Shadman | 502/4 |
| 5,810,912 A | * | 9/1998 | Akiyama et al. | 96/11 |
| 5,990,041 A | * | 11/1999 | Chung et al. | 502/416 |
| 6,066,591 A | * | 5/2000 | Murphy et al. | 502/417 |
| 6,375,716 B1 | * | 4/2002 | Burchell et al. | 95/114 |
| 6,719,147 B2 | * | 4/2004 | Strano et al. | 210/490 |
| 6,783,713 B2 | | 8/2004 | Tremblay et al. | |
| 6,852,224 B2 | | 2/2005 | Jagtoyen et al. | |

OTHER PUBLICATIONS

T. D. Burchell et al., "A Novel Process and Material for the Separation of Carbon Dioxide and Hydrogen Sulfide Gas Mixtures", Carbon, 1997, pp. 1279-1294 vol. 35 No. 9.
U.S. Appl. No. 10/467,952 (Under Secrecy Order), Applicant Bruce B. Marshall, Filed Jul. 24, 2003.

* cited by examiner

*Primary Examiner*—Ana M Fortuna
(74) *Attorney, Agent, or Firm*—Joseph A. Marasco; Marc T. Filigenzi

(57) ABSTRACT

A water filter includes a porous support characterized by a mean porosity in the range of 20 to 50% and a mean pore size of 2 to 5 µm; and a carbon filter medium membrane disposed thereon which is characterized by a mean particle size of no more than 50 µm and a mean pore size of no more than 7.2 µm.

4 Claims, 9 Drawing Sheets

WATER NANO-FILTRATION DEVICE

The United States Government has rights in this invention pursuant to contract no. DE-AC05-00OR22725 between the United States Department of Energy and UT-Battelle, LLC.

FIELD OF THE INVENTION

The present invention relates to water nano-filtration devices and methods, and more particularly to water filtration devices and methods that include a porous support with a carbon filter medium slurry-molded onto a surface thereof.

BACKGROUND OF THE INVENTION

Water purification via filtration is an issue of considerable interest in several sectors, both private and military. "Nano-filtration" of water to remove gross and large-size contaminants such as particulate matter as well as nanometer size and also smaller contaminants such as bacteria and viruses is now and will in the future be a matter of critical national and international importance, particularly in light of potential vulnerabilities to fixed water supply systems and transportable water purification systems.

OBJECTS OF THE INVENTION

Accordingly, objects of the present invention include: provision of a composite, regenerable carbon-particle-based water filter that is characterized by precisely preselectable mean pore size range, and which can be operated to provide optimal purification of water depending on the impurities contained therein. Further and other objects of the present invention will become apparent from the description contained herein.

SUMMARY OF THE INVENTION

In accordance with one aspect of the present invention, the foregoing and other objects are achieved by a water filter that includes a porous support characterized by a mean porosity in the range of 20 to 50% and a mean pore size of 2 to 5 μm; and a carbon filter medium membrane disposed thereon which is characterized by a mean particle size of no more than 50 μm and a mean pore size of no more than 7.2 μm.

For a better understanding of the present invention, together with other and further objects, advantages and capabilities thereof, reference is made to the following disclosure and appended claims in connection with the above-described drawings.

DETAILED DESCRIPTION OF THE INVENTION

One critical component of a water filtration device of the present invention is the specific porous support for the slurry-molded filter medium. Critical physical requirements of the porous support material include a mean porosity in the range of 20 to 50% and a mean pore size of 2 to 5 μm. These requirements are critical because they permit entrapment of the carbon filter medium described hereinbelow on the surface of the support while avoiding significant blockage (closure) of the pores of the support by infiltration of the carbon filter medium thereinto. The support should have a wall thickness sufficient to provide a robust device, but not so thick as to significantly impede the flow of water through the pores therein. Preferred wall thickness of the support is in the range of 0.2 to 1.5 mm; more preferred wall thickness is in the range of 0.3 to 1 mm; most preferred wall thickness is in the range of 0.4 to 0.8 mm.

Figure 1:
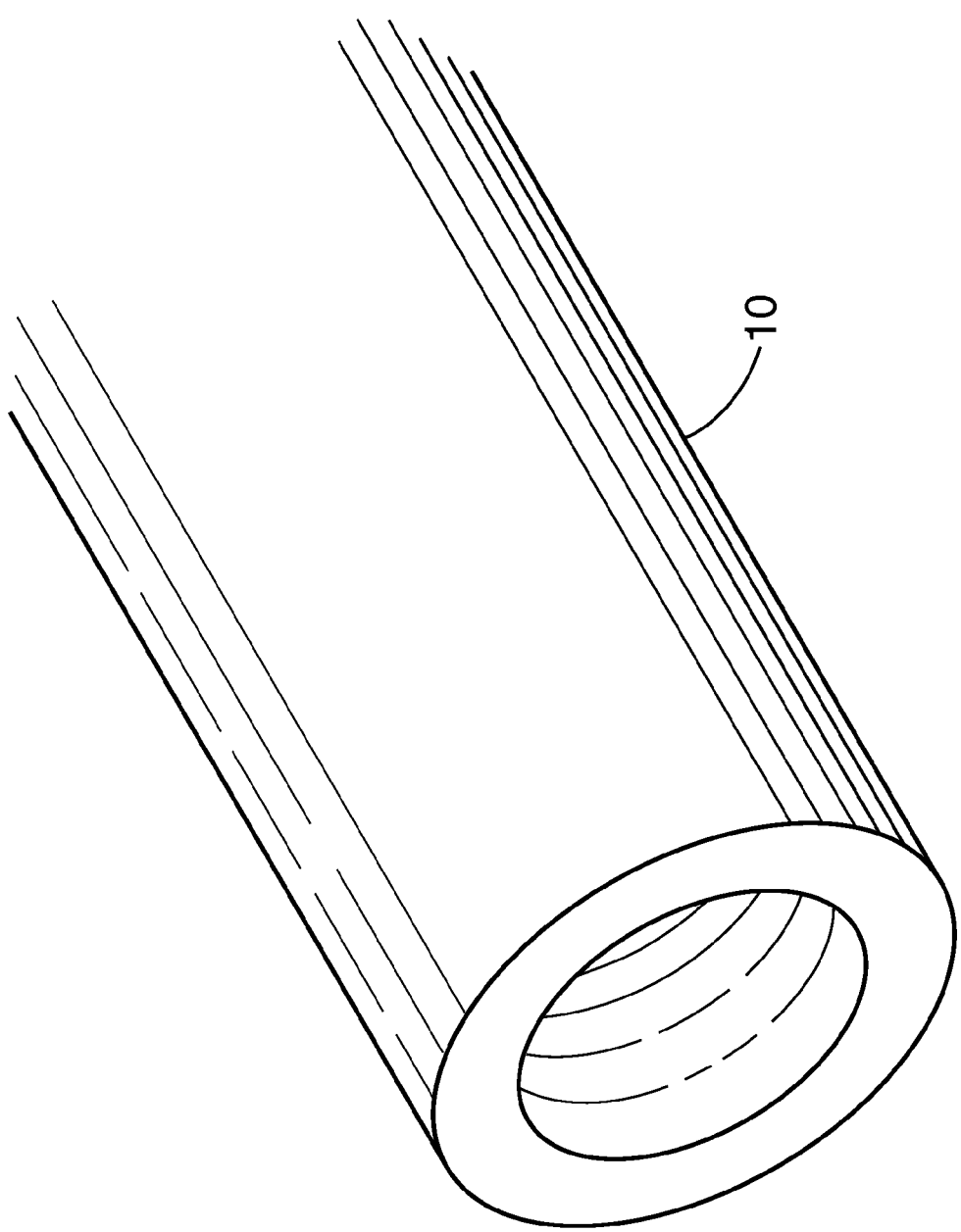
FIG. 1 is an oblique, not-to-scale view of a porous support tube in accordance with the present invention.

The support is preferably a tubular configuration with a diameter of nominally 0.45-1.0 inch, although diameter and shape are not critical to the invention. Stainless steel is a preferred material for the support, although various other materials, including metals, alloys, and polymers, may be used. A very suitable support tube is purveyed under the trade name Accusep™ and is available from Pall Corporation, 2200 Northern Boulevard, East Hills, N.Y. USA 11548-1289. FIG. 1 shows a porous support tube 10 made as described hereinabove.

The primary filter medium comprises carbon in one or more of the various forms of solid carbon, including carbon powders, particulates, fibers, and chopped fibers; the carbon may be graphitic or non-graphitic and may be activated or non-activated to provide various well known beneficial functionalities. The term "carbon filter medium" and "carbon filter media", as used herein, are intended to mean any or all of the various known forms of solid carbon, especially those forms noted hereinabove.

The method of fabrication involves using the porous support in the manner of a filter in which the carbon filter medium, suspended in a fluid (water, air, for example), is forced into the support so that the carbon filter medium is filtered from the water leaving a membrane (layer) comprised of the carbon filter medium on the surface of the support. It will be evident to the skilled artisan that carrier materials other than water may be used. For example, a smoke, solid colloidal dispersion in a gas, could also be used. Control of the membrane pore size may be accomplishing by layering the membrane by applying first a larger particle size of the membrane layer followed by a smaller size and so on until the requisite pore size is attained. Carbon filter media are especially amenable to formation of membranes of this type because carbon is available in sub-micrometer sizes to millimeter sizes.

As a general guideline, the mean pore size created in a carbon filter media membrane is generally about one-seventh the mean size of the particles of material making up the membrane. In the present invention, the maximum operable mean particle size for carbon filter media is about 50 μm; the preferred maximum mean particle size for carbon filter media is about 35 μm. Hence, the maximum pore size created in such a membrane is operably about 7.2 μm and preferably about 5 μm. It can be seen that the mean pore size of the membrane can be slightly larger than the mean pore size of the support. Porosity of the membrane can range from 1 to 50%. There is no minimum mean particle size or minimum mean pore size contemplated in the present invention. Thickness of a membrane can be as little as 3 μm or as much as 100 μm. A membrane can comprise one or more successively applied layers.

Figure 2:
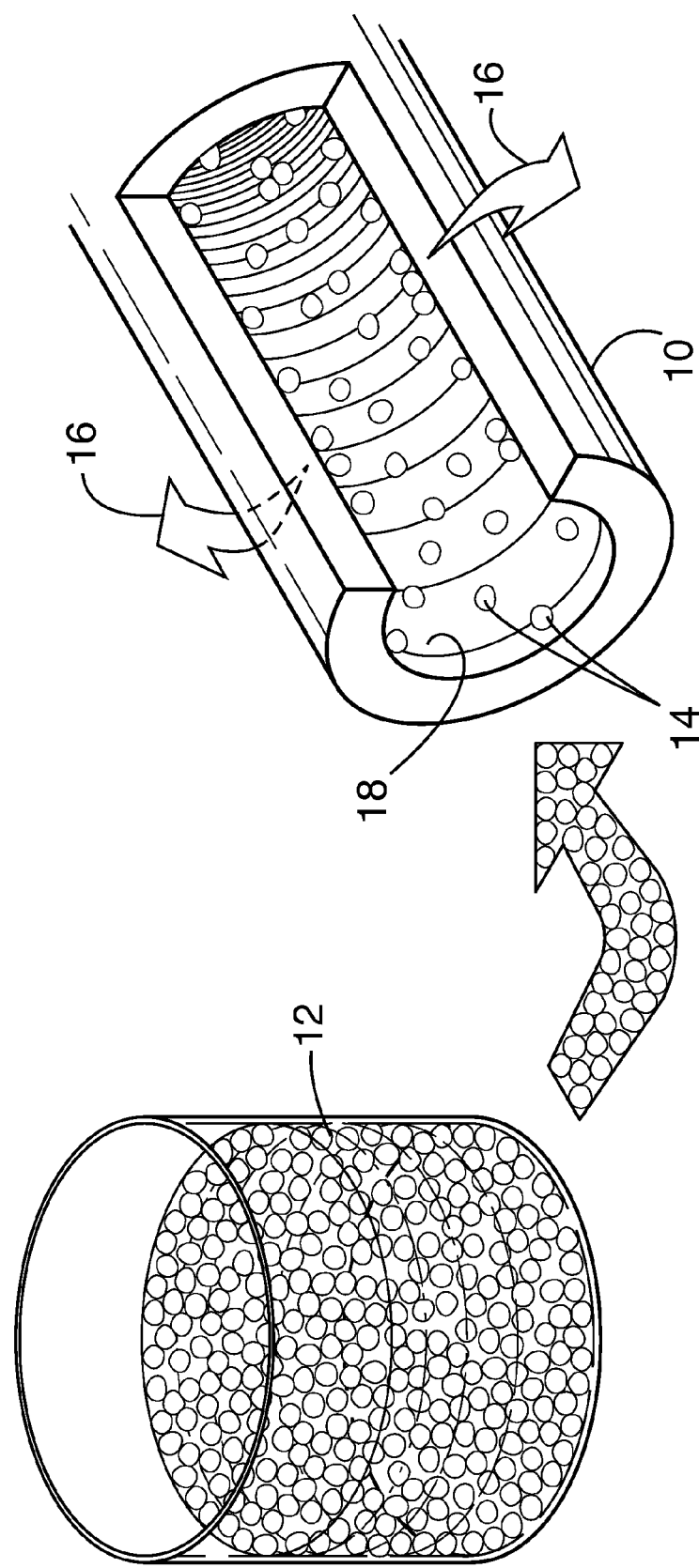
FIG. 2 is a schematic, not-to-scale view showing the process of slurry-molding a layer of a carbon filter medium onto the inner surface of a porous support tube in accordance with the present invention.
Figure 3:
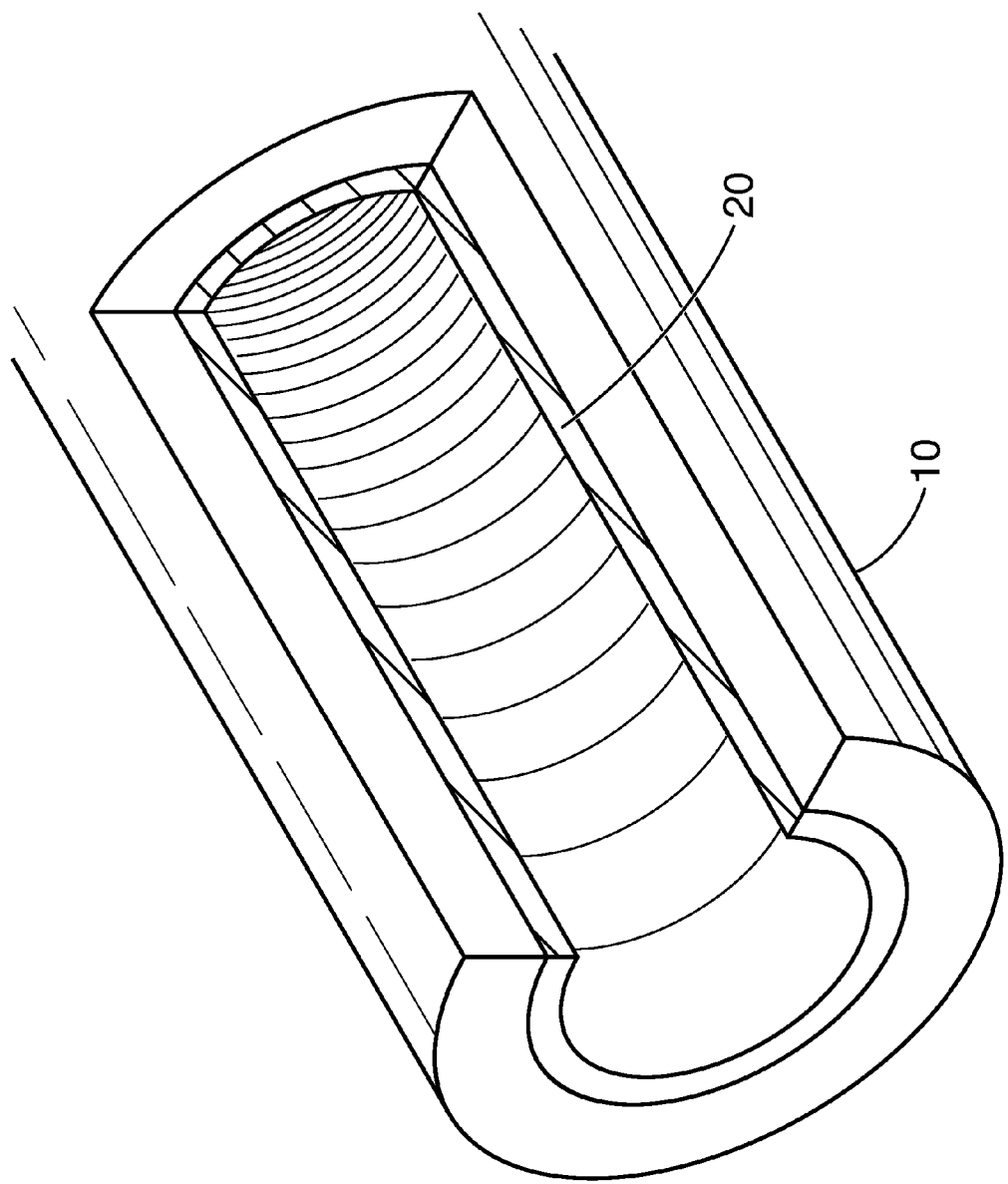
FIG. 3 is an oblique, not-to-scale view of a porous support tube having a layer of a carbon filter medium onto the inner surface thereof in accordance with the present invention.

FIG. 2 shows, for example, a slurry 12 of a first carbon filter medium 14 having a preselected mean particle size in the range of 7 to 21 μm. A general slurry-molding process is employed whereby the slurry is forced into the support tube 10. Slurry liquid (represented by arrows 16) passes through the porous tube 10 while the first carbon filter medium 14 are deposited onto the inner surface 18 of the porous support tube 10 to form a first carbon layer 20 which is shown in FIG. 3. The resulting filter has a mean pore size in the range of 1 to 3 μm and a mean porosity in the range of 10 to 30%. If the desired mean pore size is attained with the application of the first carbon layer 20, then it is not necessary to add further carbon layers and the membrane is complete.

Figure 4:
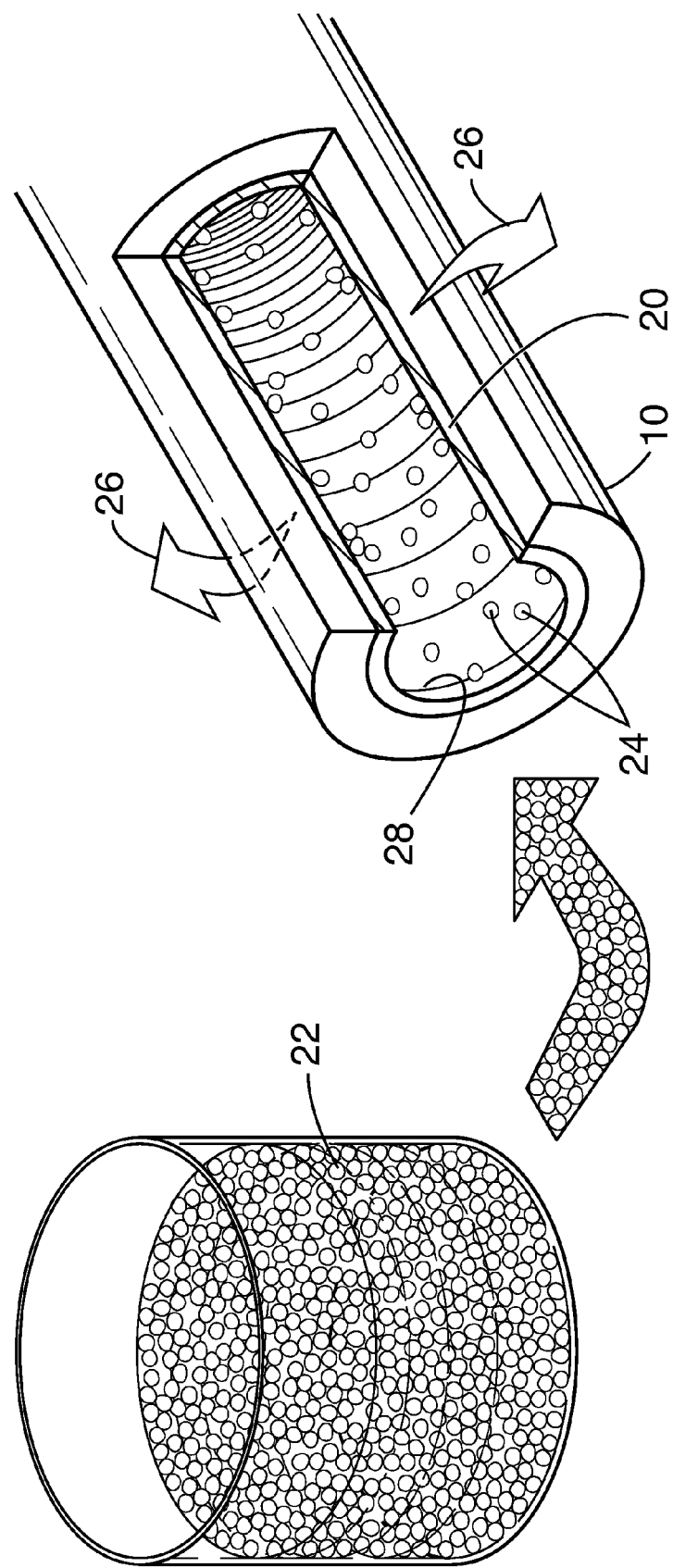
FIG. 4 is a schematic, not-to-scale view showing the process of slurry-molding a second layer of a carbon filter medium onto the inner surface of a porous support tube in accordance with the present invention.
Figure 5:
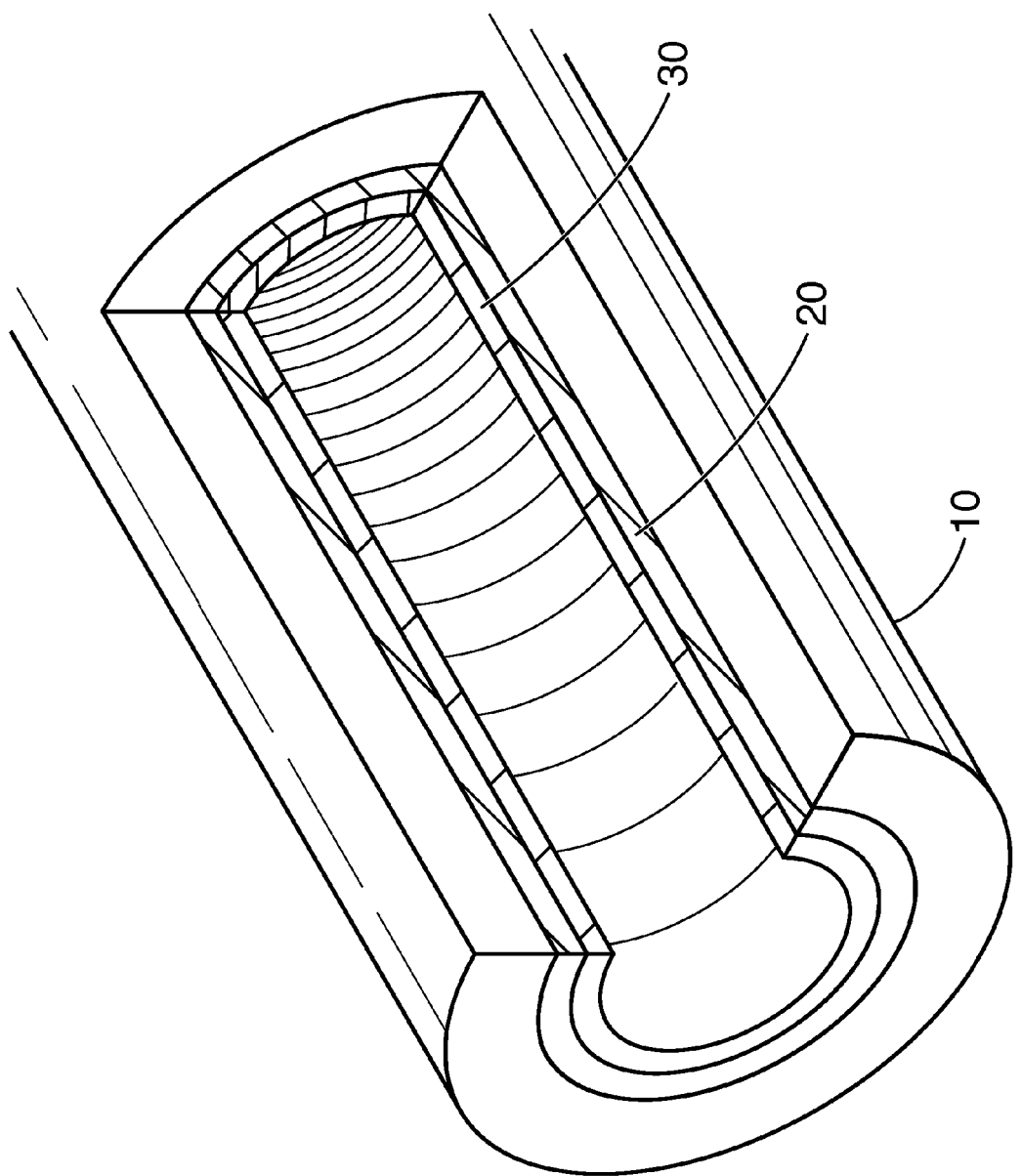
FIG. 5 is an oblique, not-to-scale view of a porous support tube having two successively applied layers of a carbon filter medium onto the inner surface thereof in accordance with the present invention.

FIG. 4 shows, for example, a slurry 22 of a second carbon filter medium 24 having a preselected mean particle size in the range of 3.5 to 7 μm. A general slurry-molding process whereby the slurry is forced into the support tube 10. Slurry liquid (represented by arrows 26) passes through the first carbon layer 20 and the porous tube 10 while the second carbon filter medium 24 are deposited onto the inner surface 28 of the first carbon layer 20 to form a second carbon layer 30 which is shown in FIG. 5. The resulting filter has a mean pore size in the range of 0.5 to 1 μm and a mean porosity in the range of 5 to 20%. If the desired mean pore size is attained with the application of the second carbon layer 30, then it is not necessary to add further carbon layers and the membrane is complete.

Figure 6:
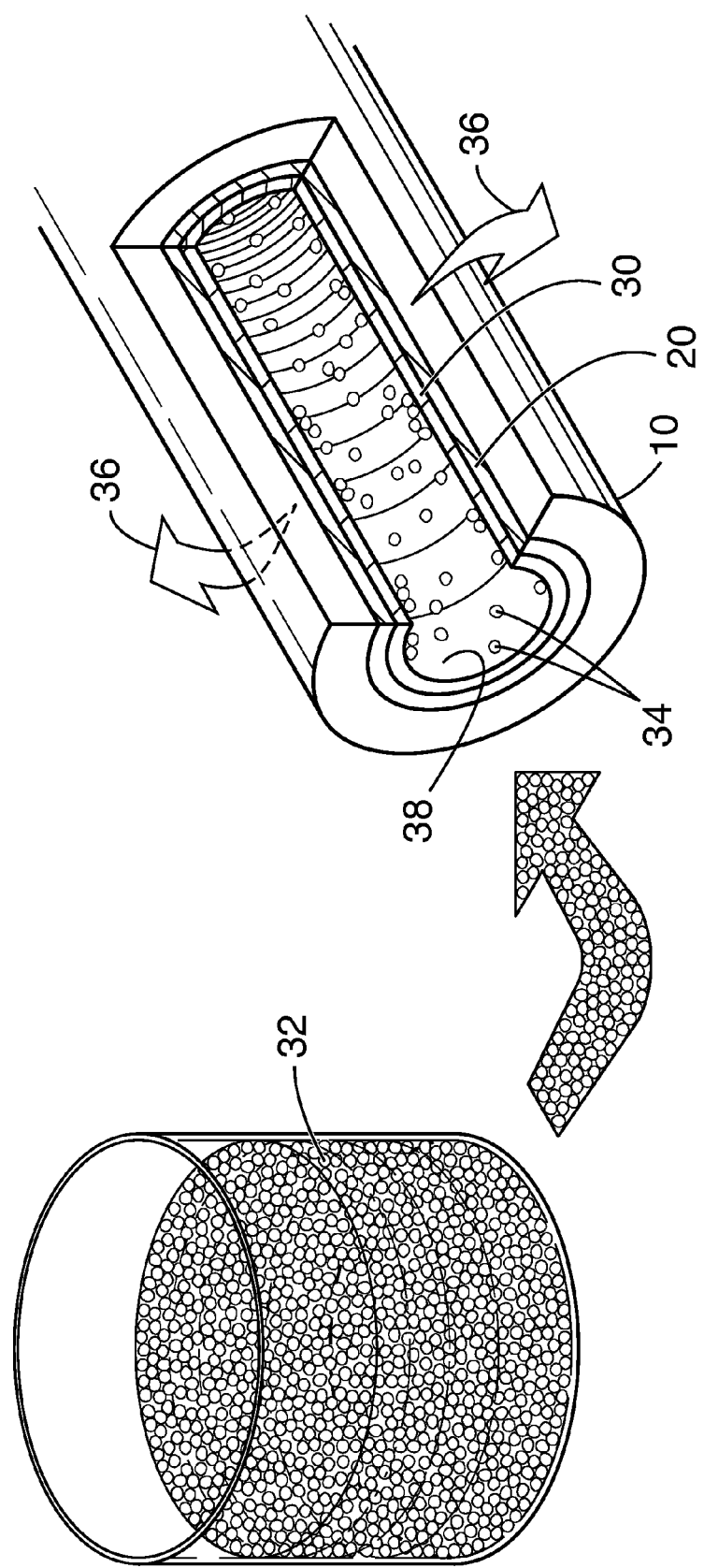
FIG. 6 is a schematic, not-to-scale view showing the process of slurry-molding a third layer of a carbon filter medium onto the inner surface of a porous support tube in accordance with the present invention.
Figure 7:
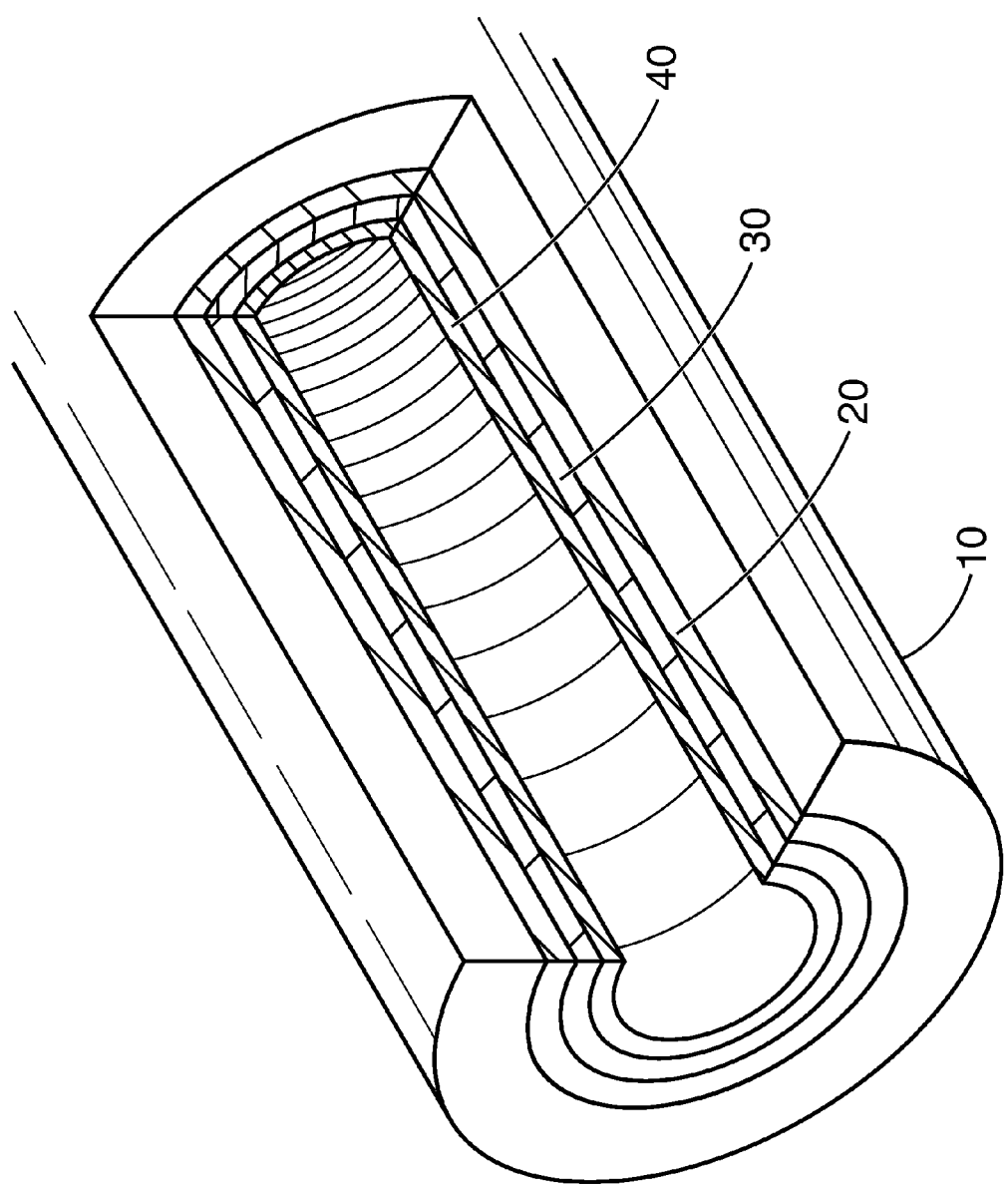
FIG. 7 is an oblique, not-to-scale view of a porous support tube having three successively applied layers of carbon filter media onto the inner surface thereof in accordance with the present invention.

FIG. 6 shows, for example, a slurry 32 of a third carbon filter medium 34 having a preselected mean particle size of <3.5 μm. A general slurry-molding process whereby the slurry is forced into the support tube 10. Slurry liquid (represented by arrows 36) passes through the second carbon layer 30, the first carbon layer 20, and the porous tube 10 while the third carbon filter medium 34 are deposited onto the inner surface 38 of the second carbon layer 30 to form a third carbon layer 40 which is shown in FIG. 7. The resulting filter has a mean pore size of <0.5 μm and a mean porosity in the range of 3 to 10%. If the desired mean pore size is attained with the application of the third carbon layer 40, then it is not necessary to add further carbon layers and the membrane is complete.

Figure 8:
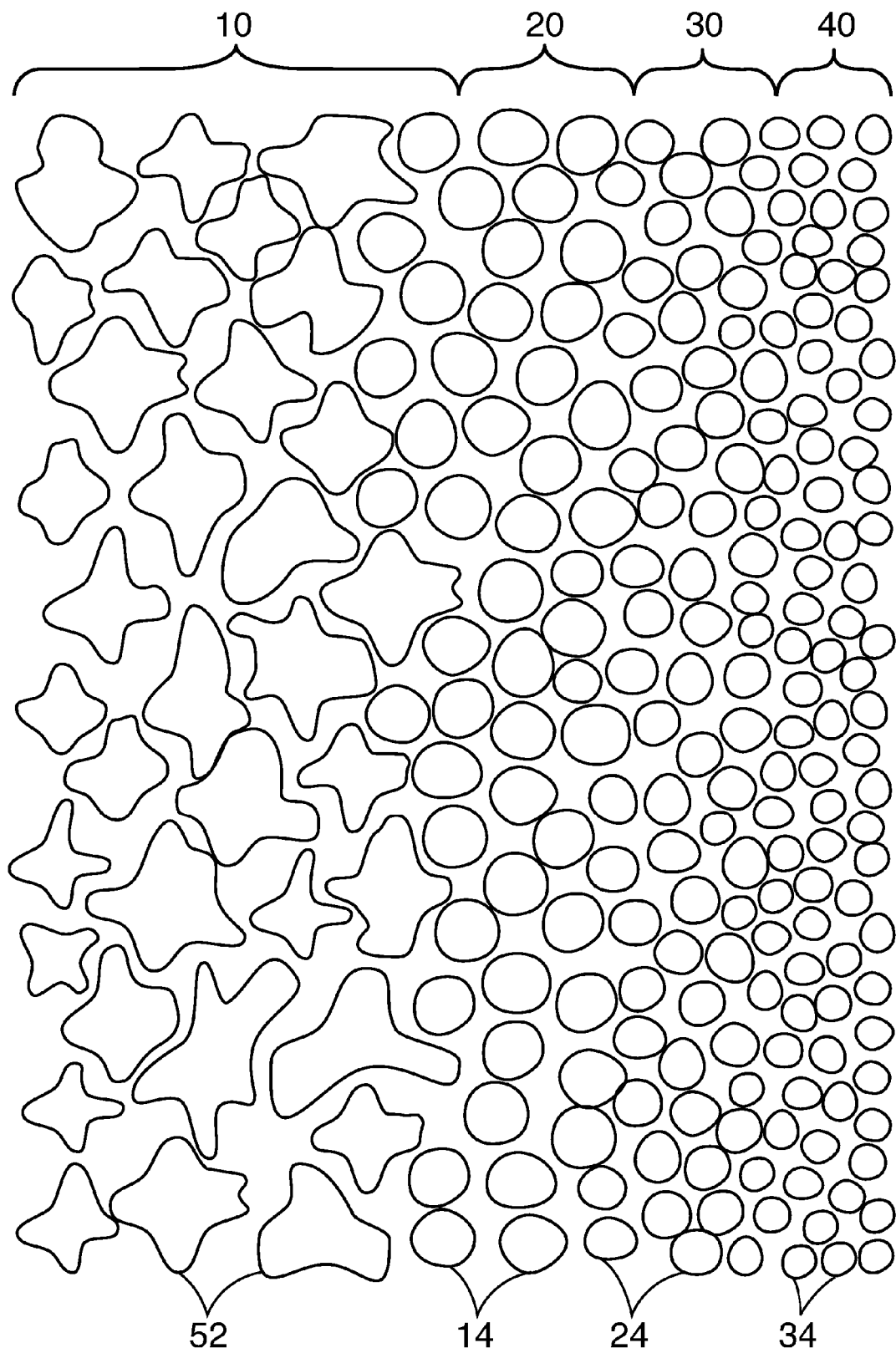
FIG. 8 is a magnified, not-to-scale, schematic view of a section of porous support tube showing three successively applied layers of carbon filter media on the inner surface thereof in accordance with the present invention.

FIG. 8 shows a magnified, not-to-scale, schematic view of particles 52 that comprise a section of porous support tube 10 and a membrane which comprises three successively applied layers 20, 30, 40 of respective carbon filter media 14, 24, 34 in accordance with the present invention as described hereinabove.

Figure 9:
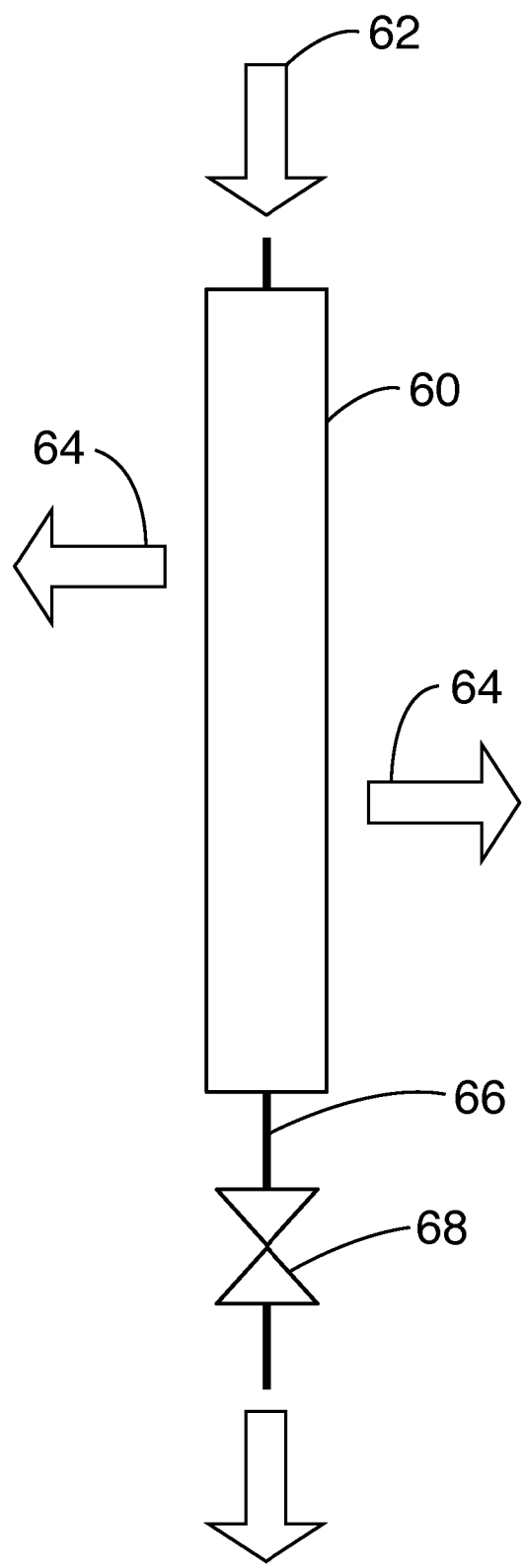
FIG. 9 is a schematic diagram showing a basic water purification system in accordance with the present invention.

FIG. 9 shows a basic water purification system in accordance with the present invention, which includes a water filtration device 60 as described hereinabove, influent line 62, purge line 66, and purge valve 68 in the purge line 66. With the purge valve 68 closed, influent water is directed by a pump, gravitational device, or the like into the water filtration device 60 via the influent line 62. The water flows radially through the membrane, filtering out (entrapping) unwanted materials, and through the porous walls of the water filtration device 60 as effluent 64 to a utilization or storage device. To purge the water filtration device 60 of entrapped materials, the purge valve 68 is opened, and influent water flows in via the influent line 62, axially through the water filtration device 60 (along the surface of the membrane), sloughing off (purging) entrapped materials while leaving the membrane intact, and flows out through the purge line 66.

The most expensive component of the filter is the support. In order to save the expense of replacing the support, the membrane can be removed and replaced. To remove the membrane, the filtration device 60 may be back-flushed by reversing the flow of the effluent 64, which will remove the membrane for replacement or reactivation and reapplication as described hereinabove.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A water filter comprising:
   a. a porous support characterized by a mean porosity in the range of 20 to 50% and a mean pore size of 2 to 5 μm; and
   b. a membrane comprising a carbon filter medium disposed on and in contact with a surface of said support, said carbon filter medium characterized by a mean particle size in the range of 7 to 21 μm, said membrane characterized by a mean pore size in the range of 1 to 3 μm and a mean porosity in the range of 10 to 30%;
   wherein said membrane is a first membrane, wherein said carbon filter medium is a first carbon filter medium, and further comprising a second membrane comprising a second carbon filter medium disposed on and in contact with a surface of said first membrane, said second carbon filter medium characterized by a mean particle size in the range of 3.5 to 7 μm, said second membrane characterized by a mean pore size in the range of 0.5 to 1 μm and a mean porosity in the range of 5 to 20%.

2. A water filter in accordance with claim 1 further comprising a third membrane comprising a third carbon filter medium disposed on and in contact with a surface of said second membrane, said third carbon filter medium characterized by a mean particle size of <3.5 μm, said third membrane characterized by a mean pore size of <0.5 μm and a mean porosity in the range of 3 to 10%.

3. A water filtration system comprising:
   a. a water filter comprising porous support characterized by a mean porosity in the range of 20 to 50% and a mean pore size of 2 to 5 μm;
   b. a membrane comprising a carbon filter medium disposed on and in contact with a surface of said support, said carbon filter medium characterized by a mean particle size in the range of 7 to 21 μm, said membrane characterized by a mean pore size in the range of 1 to 3 µm and a mean porosity in the range of 10 to 30%;
c. means for directing water into said filter; and
d. means for purging said water filter;
wherein said membrane is a first membrane, wherein said carbon filter medium is a first carbon filter medium, and further comprising a second membrane comprising a second carbon filter medium disposed on and in contact with a surface of said first membrane, said second carbon filter medium characterized by a mean particle size in the range of 3.5 to 7 µm, said second membrane characterized by a mean pore size in the range of 0.5 to 1 µm and a mean porosity in the range of 5 to 20%.

4. A water filtration system in accordance with claim 3 further comprising a third membrane comprising a third carbon filter medium disposed on and in contact with a surface of said second membrane, said third carbon filter medium characterized by a mean particle size of <3.5 µm, said third membrane characterized by a mean pore size of <0.5 µm and a mean porosity in the range of 3 to 10%.

* * * * *